Patented Aug. 15, 1939

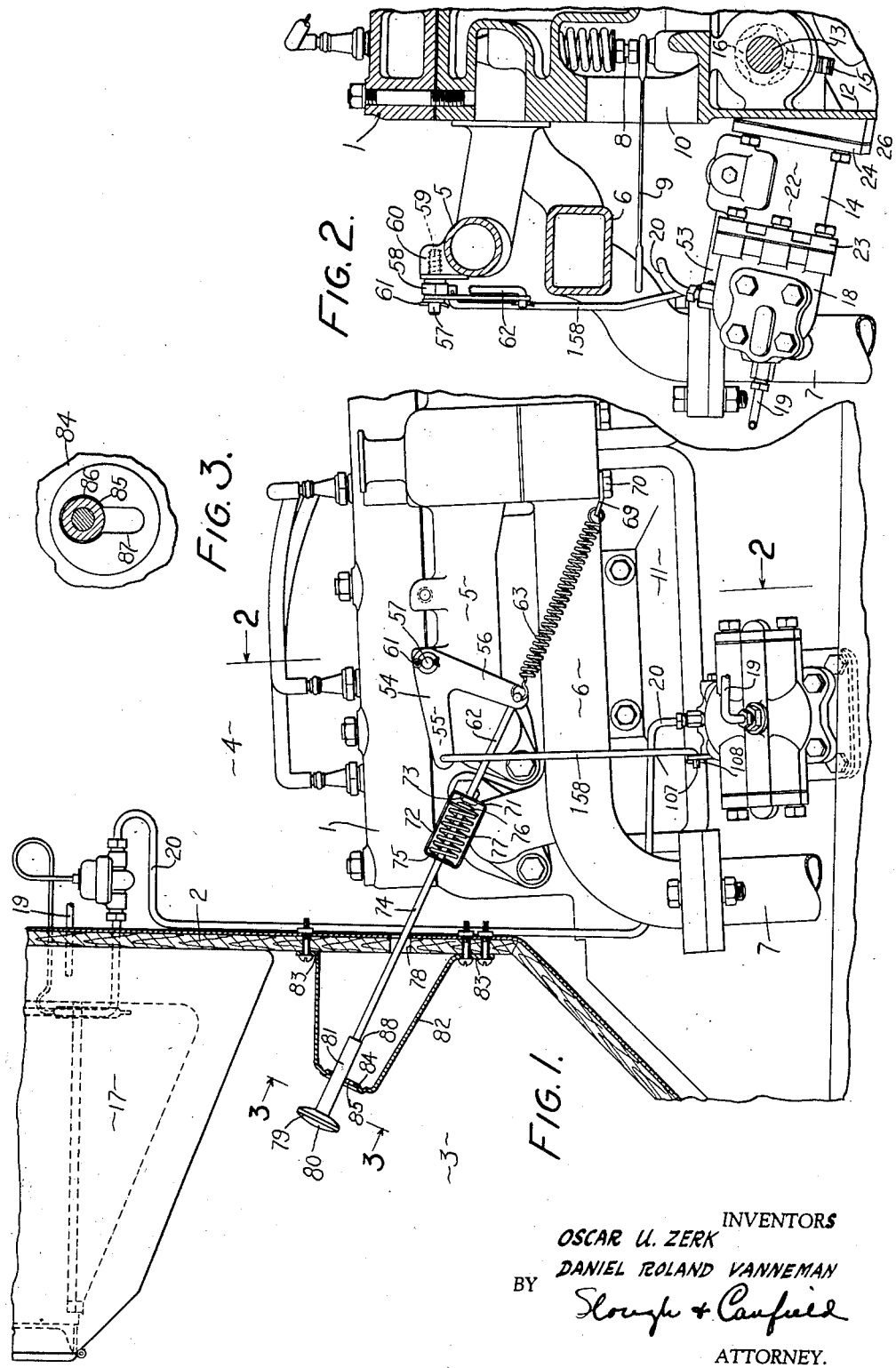

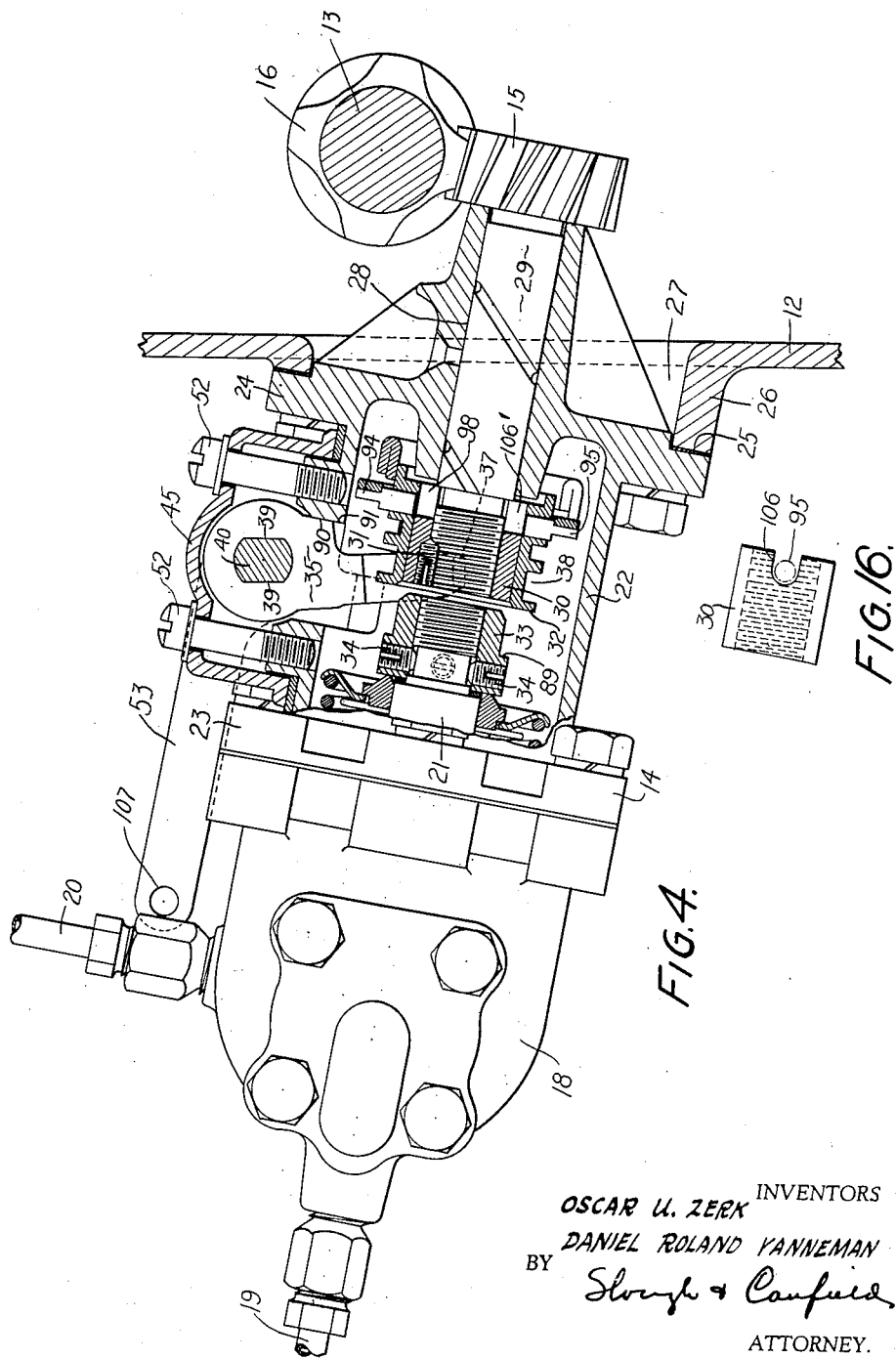

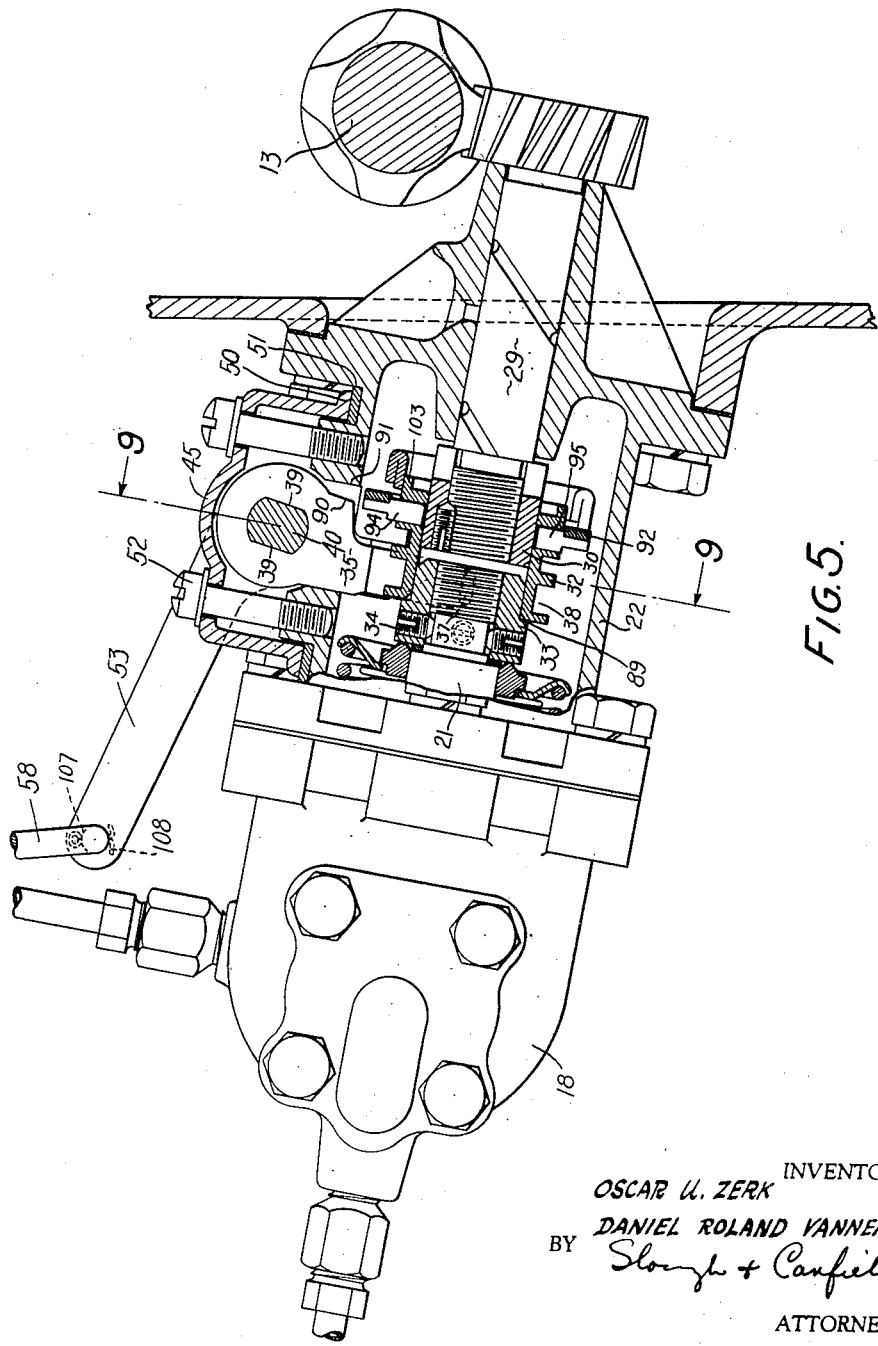

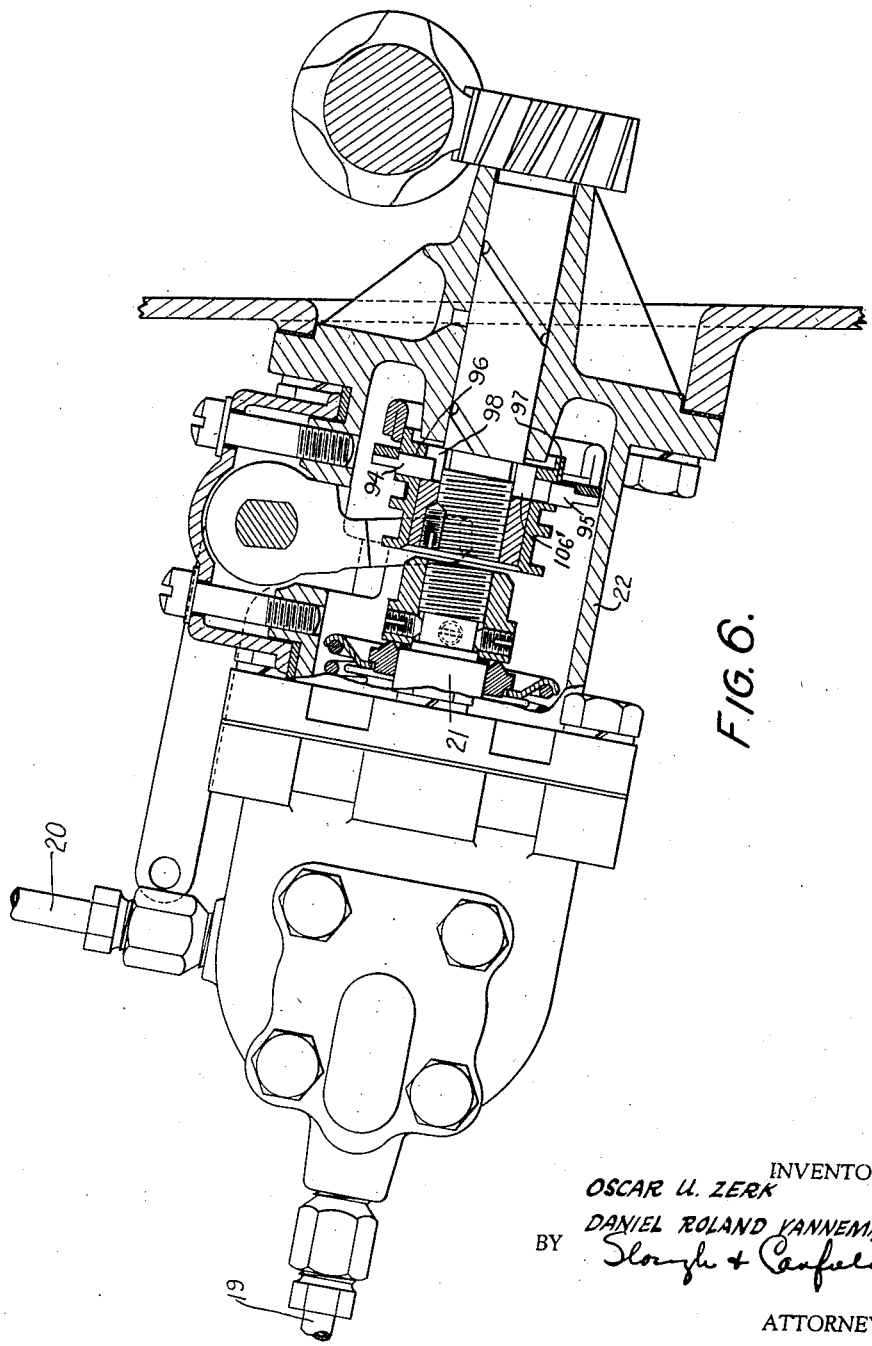

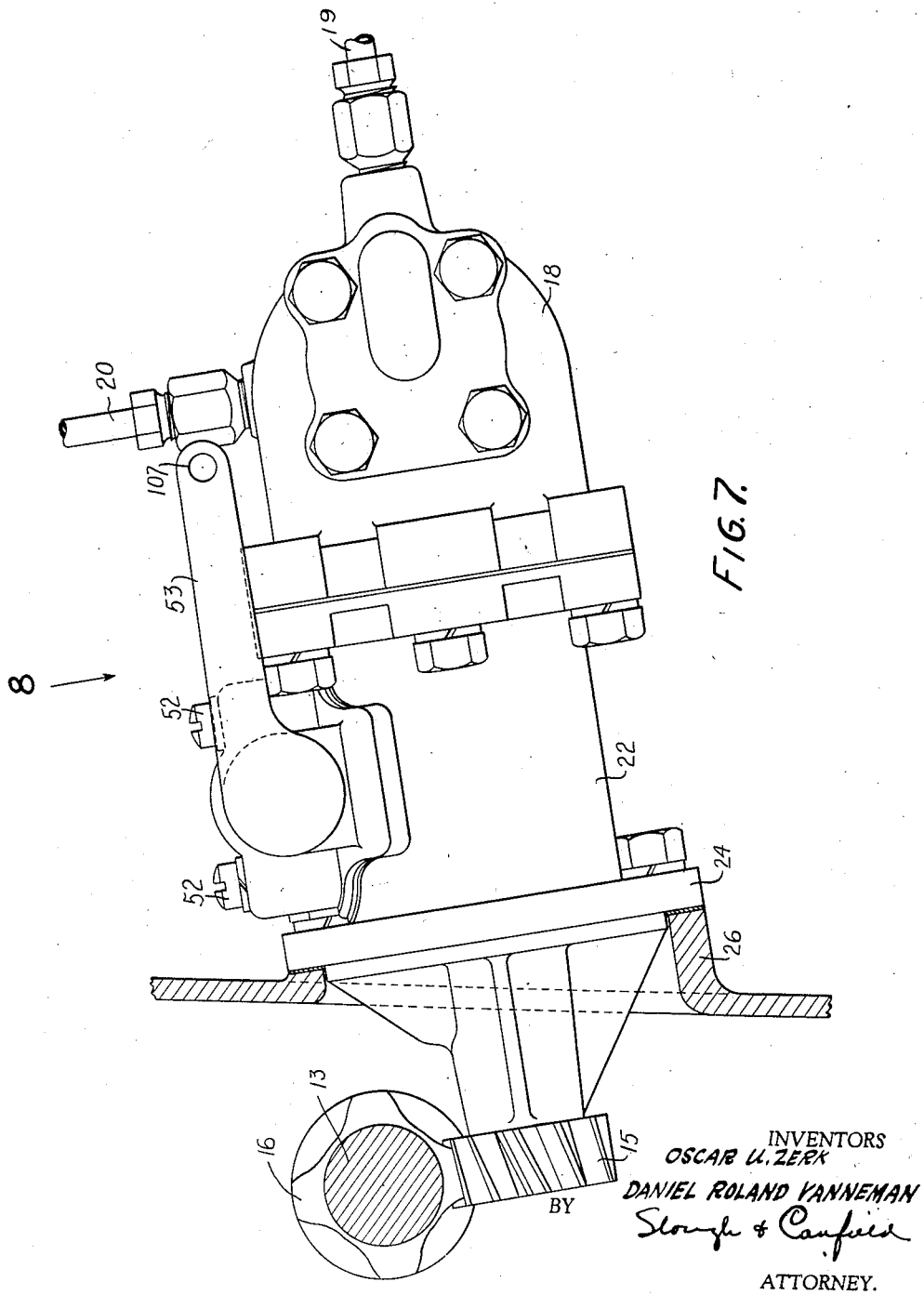

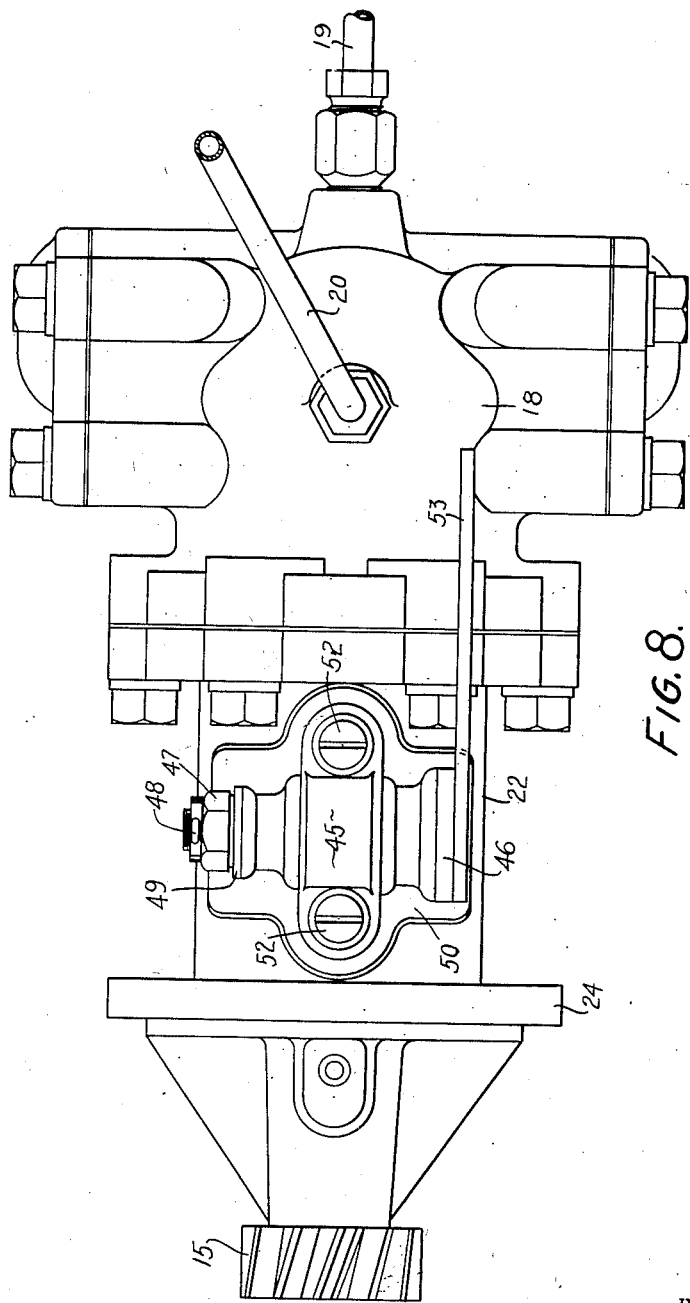

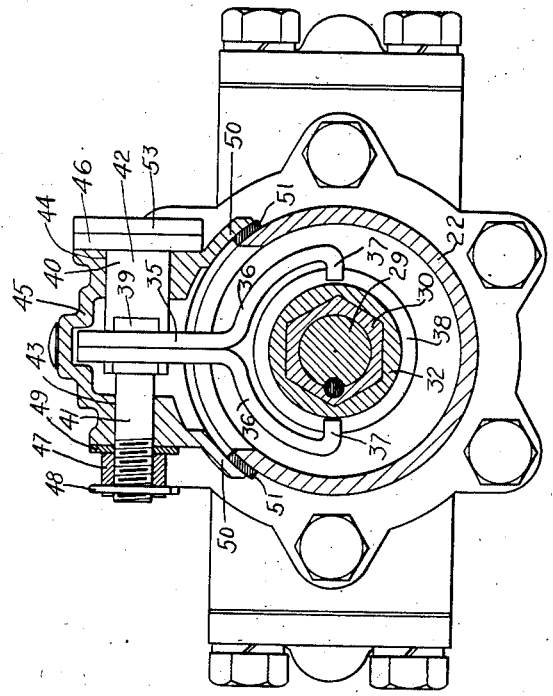

2,169,333

UNITED STATES PATENT OFFICE 2,169,333

POWER-TRANSMITTING CLUTCH AND OPERATING MEANS THEREFOR

Oscar U. Zerk and Daniel Roland Vanneman, Chicago, Ill.; said Vanneman assignor to said Zerk Application July 1, 1935, Serial No. 29,335
Renewed February 26, 1938

17 Claims. (Cl. 192—67)

This invention relates to clutch devices for coupling and uncoupling a mechanism with a source of driving power, particularly a variable speed power source. The invention has particular application to the clutches of mechanisms driven by power take-off from the engine of an automotive vehicle and to the operation of the clutch from the passenger compartment of the vehicle, and will be described herein as applied to that use.

Among the objects of the invention are:

To provide an improved power transmission clutch device;

To provide a clutch device for coupling and uncoupling a driven mechanism with a variable speed source of power;

To provide a clutch mechanism having improved means for operating it;

To provide an improved housing-enclosed clutch mechanism and improved means for operating it through the housing wall;

To provide a clutch mechanism having improved means for operating it from a distance;

To provide a clutch mechanism having improved means for retaining it in operated positions;

To provide a clutch device operable to effect coupling and uncoupling of rotary driving and driven elements and having improved means to prevent coupling operations except at predetermined low speeds of the driving element;

To provide a clutch mechanism for coupling and uncoupling rotary elements having improved centrifugal means to lock it against operation except at predetermined low speed.

Other objects will be apparent to those skilled in the art to which our invention appertains.

Our invention is fully disclosed in the following description taken in connection with the accompanying drawings, in which:

Fig. 1 is a side elevational view of a part of a motor vehicle and engine thereof partly in cross-section and illustrating, in connection with a mechanism driven by power take-off from the engine, an embodiment of our invention for operating a clutch device of the mechanism from the passenger compartment of the vehicle;

Fig. 2 is a cross-sectional view taken from the plane 2—2 of Fig. 1 with parts behind the section plane omitted;

Fig. 3 is a fragmentary cross-sectional view taken from the plane 3—3 of Fig. 1;

Fig. 4 is a view partly in side elevation and partly in longitudinal section of a compressor mechanism shown in Figs. 1 and 2 driven by power take-off from the engine and illustrating a clutch mechanism embodying a part of our invention;

Fig. 5 is a view similar to Fig. 4 illustrating parts thereof in different operative positions;

Fig. 6 is another view similar to Fig. 4 showing operative parts thereof in other positions;

Fig. 7 is a side elevational view of the compressor mechanism of Fig. 2, viewed from the opposite side thereof and drawn to a larger scale;

Fig. 8 is a top plan view of the compressor of Fig. 7, the view being taken in the direction of the arrow 8 of that figure;

Fig. 9 is a cross-sectional view taken from the plane 9—9 of Fig. 5;

Fig. 10 is a cross-sectional view illustrating separately some of the parts of a clutch locking mechanism constituting part of our invention and illustrated in Figs. 4, 5 and 6;

Fig. 11 is a side elevational view taken in the direction of the arrow 11 of Fig. 10;

Fig. 12 is a side elevational view taken in the direction of the arrow 12 of Fig. 11;

Fig. 13 is a bottom plan view taken in the direction of the arrow 13 of Fig. 12;

Fig. 14 is a cross-sectional view taken from the plane 14—14 of Fig. 10;

Fig. 15 is a perspective view of the elements of Figs. 10 to 13 inclusive, illustrating parts thereof in different operative positions;

Fig. 16 is a side elevational view of a sleeve element shown in section in Figs. 4, 5 and 6.

Referring to the drawings, we have shown generally at 1 a part of the internal combustion engine of an automotive vehicle, and at 2 a part of the dash or compartment wall between the passenger compartment 3 and the engine compartment 4 of the vehicle. The engine comprises an intake manifold 5 and exhaust manifold 6, the latter communicating with an exhaust pipe 7. In Fig. 2 is illustrated at 8 the tappet mechanism for adjusting the valve tappet by means of a horizontally swingable wrench 9, access being had to the tappet mechanism through an aperture 10 in the engine casing accessible upon removing a cover plate 11 shown only in Fig. 1, omitted from Fig. 2.

The engine illustrated has a walled casing 12 in the lower part thereof in which is rotatably supported the engine cam shaft 13. Illustrated generally at 14 is a mechanism enclosed within a housing, the mechanism being driven by power take-off from the cam shaft 13 by means of a gear 15 of the mecahnism meshed with a worm 16 on the cam shaft.

While our invention may be applied to various parts of mechanism, the mechanism illustrated and described herein is a refrigerant compressor constituting the compressor of a refrigerating system of the compressed refrigerant type for refrigerating a cabinet 17 in the passenger compartment 3 of the motor vehicle, preferably supported upon the dash 2.

The mechanism 14 comprises a compressor, not shown, but housed within a housing 18, driven in a manner to be described and supplying compressed refrigerant through an outlet pipe 19 illustrated fragmentarily in Figs. 1 and 2 leading from the compressor, and illustrated fragmentarily in Fig. 1 as associated with refrigerating cabinet 17 and a return refrigerant pipe 20. The refrigerant compressor is driven by a shaft 21 (see Fig. 6) by power from the engine cam shaft 13 in a manner which will now be described.

The mechanism 14 besides comprising the compressor housing 18, comprises a clutch housing 22, generally cylindrical in form, having a flange 23 at one end secured to the compressor housing 18 and at the other end having a flange 24 secured upon the outer end 25 of a tubular wall 26 peripherally surrounding an aperture 27 in the casing wall 12 of the engine. The outer end 25 of the wall 26 is disposed in a plane inclined upwardly inwardly with respect to the engine housing, to dispose the axis of the clutch housing 22 at a slight upward inclination to the horizontal, an inclination of 10 to 15 degrees being preferred.

The clutch housing 22 has formed therein a cylindrical bore 28 in which is rotatably mounted a driving shaft 29 carrying on its outer end the said gear 15 meshed with the worm 16. By means of the angular inclination above referred to, the shaft 29 is inclined and disposes the gear 15 at an inclination under the cam shaft 13 whereby clearance between the gear 15 and the rotating cranks and counter-weights on the main shaft of the engine is provided.

Upon the inner end of the driving shaft 29 is threaded a sleeve 30 exteriorly hexagonal in form and secured against rotation by a screw 31 threaded into mating keyways of the sleeve 30 and shaft 29. A female clutch element 32, interiorly hexagonal in cross-section, is telescoped over and reciprocably supported on the sleeve 30.

On the shaft 21 above referred to is threaded a male clutch element 33, exteriorly hexagonal in form, and secured against rotation on the shaft 21 by radially disposed set screws 34—34 threaded through the clutch element 33 and engaging the shaft 21.

In a manner to be described, the clutch element 32 may be moved axially to telescope a portion thereof over the clutch element 33, the parts moving from the position of Fig. 4 to that of Fig. 5 and the clutch element 32 thus couples together the shafts 29 and 21. Power received by the shaft 29 from the cam shaft 13 drives the shaft 21 to correspondingly drive the mechanism in the housing 18.

Conversely, upon returning the female clutch element 32 to the position of Fig. 4, the two shafts are, as will be clear, uncoupled.

To thus shift the female clutch element 32, a fork 35 is provided, preferably formed from two fork arms 36—36 made from sheet metal and welded together, each having on the end thereof a finger 37, the fingers projecting diametrically into a groove 38 in the female clutch element 32. By oscillating the fork 35, the fingers 37 in the groove 38 will reciprocate the female clutch element 32 to shift it as above described.

To oscillate the fork 35, a shaft 40 has flats 39—39 thereon press-fitted into a corresponding perforation in the outer end of the fork 35. To oscillatably support the shaft 40, it has cylindrical portions 41 and 42 having oscillatory bearing in bores 43—44 in opposite walls of a cup-form housing element 45. One end of the shaft 40 has, exteriorly of its bore 44, a head 46 fitted upon the housing on its under side to close and substantially seal the outer end of the bore 44. The other end of the shaft is threaded and projects out of the bore 43, and a castellated nut 47 thereon, secured in adjusted position by a cotter pin 48, holds a washer 49 against the housing to substantially seal the bore 43. The nut 47 also operates to hold the head 46 against the housing to seal the bore 44 as described.

The cup-form housing 45, downwardly open, has a flange 50 fitting the cylindrical outer wall of the clutch housing 22 and may have a sealing gasket 51 thereunder. Screws 52—52 projected through the housing 45 and threaded into the wall of the clutch housing 22, firmly mount the cup-form housing 45 on the clutch housing 22 in sealed relation thereto and support the clutch shaft 40 and fork 35 in clutch-shifting relation to the groove 38 as above described.

A clutch-shifting arm 53, preferably formed from sheet metal, is secured as by welding, to the head 46; and as will now be clear, the clutch may be shifted to couple the shafts 29 and 21 by elevating the outer end of the arm 53 and to uncouple them by depressing it. To elevate and depress the arm 53, the following means is provided.

A bell crank 54 comprising arms 55 and 56 is oscillatably supported upon a stud 57, the stud comprising a hexagonal body portion 58 and a threaded shank 59, the latter being screwed into an abutment 60 formed upon the intake manifold 5 of the engine above referred to. A cotter pin 61 retains the bell crank on the stud 57. The arm 55 of the bell crank is preferably disposed substantially horizontally in its normal position and a generally vertically disposed rod 158 has the ends thereof bent laterally, the lower end being projected through a perforation 107 in the outer end of the clutch shifting arm 53 and secured therein by a cotter pin 108; and the upper end of the rod 58 being projected through a perforation in the end of the arm 55 and similarly secured therein.

A rod 62 has one end bent at an angle and projected through a perforation in the end of the bell crank arm 56. A tension spring 63 is hooked at one end through the projected end of the rod 62 and at its other end hooked into a clip 69 secured under a screw 70 on the engine. The spring 63 thus normally holds the bell crank 54 in a counter-clockwise oscillated position thrusting downwardly on the rod 58 and resiliently holding the arm 53 in a normal clutch uncoupling position.

The opposite end of the rod 62 is projected through a perforation in one end 71 of a cylindrical sheet metal box-like housing 72 and has a head 73 inside the housing. A rod 74 projects through the opposite end 75 of the housing 72 having a head 76 thereon, and a compression spring 77 abuts at one end upon the inner side of the end 75 of the housing and at its opposite end upon the head 76. Preferably the heads 73 and 76 are disposed adjacent or in engagement with each other. The rod 74 extends through an aperture 78 in the dash or compartment wall 2 and at its end carries a handle 79 comprising a knob 80 on a shank 81, the latter being connected to the rod 74 and of substantially greater diameter than the rod.

A bracket or housing 82 is supported by a flange or feet 83—83 on the passenger compartment side of the dash 2, and is preferably formed from sheet metal and has a wall portion 84 disposed transversely of the shank 81 and provided with a perforation 85 through which the shank extends. The perforation 85 is preferably of key-hole form comprising a generally circular portion 86, of such size as to loosely encircle the shank 81 and a slotted portion 87 slightly greater in width than the diameter of the rod 74.

In the clutch uncoupled position of the parts above described, the shank 81 is in the perforation portion 86. To operate the clutch, the driver or a passenger in the passenger compartment 3 grasps the knob 80 and pulls thereon and on the rod 74. The head 76 in the housing 72 thereupon exerts compressive force on the spring 77, moving the housing 72 and with it the head 73 and rod 62. This force elongates the spring 63 and causes the bell crank 54 to be oscillatably moved clockwise, elevating the rod 58 and operating the clutch to the coupling position. After the clutch has thus been shifted, further movement of the knob 80 will carry the end 88 of the shank 81 outwardly beyond the perforation portion 86 whereupon the knob 80 may be depressed to lodge the rod 74 in the portion 87 of the perforation to lock the rod 74 in its clutch-operated position. The latter part of this movement is effected by compression of the spring 77, thus insuring that the clutch will be fully operated before the handle 79 is locked in the operated position.

To operate the clutch to the uncoupling position, the handle 79 may be elevated by pushing upwardly on the knob 80, and when the end 88 of the shank 81 reaches the perforation portion 86, the spring 77 will then draw the shank 81 through the perforation and then the spring 63 will operate the bell crank 54 counter-clockwise to shift the clutch and hold it in shifted position.

To limit the coupling movement of the clutch, the inner end of the female clutch element 32 abuts upon an annular shoulder 89 on the male clutch element 33 provided for this purpose as shown in Figs. 4 and 5. To limit the uncoupling movement of the clutch, the fork 35 has thereon a shoulder 90, Figs. 4 and 5, which abuts upon a wall portion 91 of the clutch housing 22.

For the sake of simplicity and cost of production, the positive type clutch above described is desirable. To avoid the danger of injury to the clutch and rapid deterioration thereof, as well as the shock upon the driven mechanism which would be occasioned by attempting to operate the clutch at the higher speeds of the cam shaft, corresponding for example to vehicle speeds above 20 miles per hour, the following means is provided to prevent shifting of the clutch to its coupling position except at predetermined low speeds. Preferably, such permissible clutch shifting speeds are at or below the idling speed of the engine.

A ring 92 surrounds the female clutch element 32 and has secured thereto, for example as by spot-welding at 93—93, a long pin 94 and a short pin 95 diametrically axially aligned. Diametrically axially aligned bores 96 and 97 are provided in the wall of the female clutch member 32 in which the pins 94 and 95 are longitudinally oscillatably supported. The ring 92 is thus supported by the pins in their bores and the ring and the pins may reciprocate in unison in the direction transversely of the clutch element 32.

A slot 98 is provided in the clutch sleeve 30 in axial alignment with the pin bore 96. A pair of weights 99—99 are provided secured to the ring 92, at opposite sides of the pin 95, the weights being on opposite sides of the ring and being preferably arcuate in form.

A pair of posts 100—100 project from the face of the ring 92 on the opposite side diametrically from the weights 99—99 and a flat spring 101 has the intermediate portion thereof disposed at the bottom of a groove 106 in the female clutch member 32 and at its opposite ends is hooked over the posts 100—100. The spring 101 thus exerts resilient diametrically directed force normally holding the pin 95 projected inwardly into its bore 97 and the pin 94 withdrawn from the slot 98 and into the bore 96 of the clutch element.

A weight 102 is secured to an axially extending flange on the clutch element 32 at the side thereof opposite to the weights 99—99 and is preferably of arcuate form. The weights 99 and 102 are preferably formed from sheet metal strips bent into U-form and secured by welding or the like to ring 92 and the flange of clutch element 32, respectively as above described, by means of one leg of the U. Reciprocatory movement of the ring 92 is limited, being stopped in the direction in which it is normally held by the spring 101, upon the clutch element 32 at the periphery of the bore 96 as shown at 104; and in the other direction is stopped by the engagement of the ring with the clutch element at the periphery of the bore 97 as at 105.

At speeds of the shaft 29 corresponding to idling speeds of the engine or lower speeds including stand-still, the longer pin 94 is retracted into its bore 96 sufficiently to clear the end thereof with the slot 98 in the clutch sleeve 30. If, to facilitate production of the sleeve 30, a slot 106' is provided in the sleeve axially aligned with the slot 98, the short pin 95 is too short to project thereinto. The clutch element 32, therefore, is free to be axially moved to coupling position. When, however, the shaft 29 rotates at speeds above the idling speed, centrifugal force acting upon the weights 99—99 will project the long pin 94 inwardly in its bore 96 and on into the bore 98 in the sleeve, thus locking the clutch element 32 to the sleeve and preventing its being shifted to coupling position. The bore 97 of the short pin 95 is long enough so that the short pin will not be withdrawn therefrom. The parts, remain in this locked position during all the higher speeds of rotation and at such speeds the weight 102 acts as a counter-weight to balance the centrifugal weights 99—99.

The speed of rotation of the shaft 29 at which the centrifugal device just described operates to lock the clutch will be determined by the mass of the weights 99—99 and by the tension of the spring 101.

If the clutch be operated to its uncoupling position while the engine is operating at a high speed, i. e. if it be moved from the coupled position of Fig. 5 to the uncoupled position of Fig. 4, the female clutch element 32 upon being moved to the off position will thereby align the long pin 94 with the slot 98 of the sleeve 30 and the pin will immediately be projected into the bore 98 by centrifugal force acting on the device, and lock it in the off position.

Reference is hereby made to our co-pending applications Serial No. 29,332, filed July 1, 1935, Serial No. 29,333, filed July 1, 1935 (renewed March 14, 1938), Serial No. 29,334, filed July 1, 1935, Serial No. 29,336, filed July 1, 1935 (renewed July 12, 1938), and also to the co-pending applications of Oscar U. Zerk, Serial No. 205,707 and Serial No. 205,708, both filed on May 3, 1938, wherein we reserve the right to claim patentable subject matter disclosed herein, in whole or in part, though not claimed herein, the invention claimed herein being more particularly limited to the clutch mechanism, as claimed.

Our invention is not limited to the exact details shown and described. Many modifications and changes may be made therein within the spirit of our invention and without sacrificing its advantages, and within the scope of the appended claims.

We claim:

1. A clutch device for coupling a pair of rotatable shafts, comprising a tubular clutch element reciprocable axially on a rotatable shaft means, means preventing relative rotation of the said element and its shaft means, a pair of diametrically opposite aligned bores extending through the wall of the tubular clutch element, a third bore in the shaft means aligned with one of the said element bores, pins in the element bores, a ring circumscribing the clutch element supported on the pins, a spring constraining the ring and pins in one diametral direction, a weight on the ring to move it by centrifugal force in the other direction when rotated at speeds above a predetermined maximum to project a pin into the third bore to lock the tubular clutch element to the shaft means.

2. A clutch device for coupling a pair of rotatable shafts, comprising a tubular clutch element reciprocable axially on a rotatable shaft means, means preventing relative rotation of the said element and its shaft means, a pair of diametrically opposite aligned bores extending through the wall of the tubular clutch element, a third bore in the shaft means aligned with one of the said element bores, pins in the element bores, a ring circumscribing the clutch element supported on the pins, a pair of posts on the ring, an annular groove in the clutch element, a spring in the groove engaging the posts at opposite ends to constrain the ring and pins in one diametral direction, a weight on the ring to move it by centrifugal force in the other direction when rotated at speeds above a predetermined maximum to project a pin into the third bore to lock the tubular clutch element to the shaft means.

3. A clutch device for coupling a pair of rotatable shafts, comprising a tubular clutch element reciprocable axially on a rotatable shaft means, means preventing relative rotation of the said element and its shaft means, a pair of diametrically opposite aligned bores extending through the wall of the tubular clutch element, a third bore in the shaft means aligned with one of the said element bores, pins in the element bores, a ring circumscribing the clutch element supported on the pins, a spring constraining the ring and pins in one diametral direction, a weight on the ring to move it by centrifugal force in the other direction when rotated at speeds above a predetermined maximum to project a pin into the third bore to lock the tubular clutch element to the shaft means, and a second weight on the clutch element to dynamically balance the device at predetermined rotational speeds.

4. In a clutch device for coupling a pair of rotatable shafts, an externally hexagonal clutch element rigidly connected to one shaft, an externally hexagonal sleeve rigidly connected to the other shaft, an internally hexagonal tubular clutch element axially movable on the sleeve, a groove in the movable clutch element for shifting it axially, a pair of aligned radially extending bores in the sleeve and movable clutch element, a bore in the movable clutch element diametrically aligned with the said bore therein, pins in the said movable element bores, a ring supported on the pins, a weight on the ring operable by centrifugal force at rotary speeds above a predetermined maximum to project a pin into the bore in the sleeve to lock the movable clutch element to the sleeve, and resilient means to normally hold the said pin withdrawn from the bore in the sleeve.

5. A clutch device for coupling a pair of rotatable shafts, comprising a tubular clutch element reciprocable axially on a rotatable shaft means, means preventing relative rotation of the said element and its shaft means, a pair of diametrically opposite aligned bores extending through the wall of the tubular clutch element, a third bore in the shaft means aligned with one of the said element bores, pins in the element bores, a connector connecting the pins, a spring constraining the connector and pins in one diametral direction, a weight on the connector to move it by centrifugal force in the other direction when rotated at speeds above a predetermined maximum to project a pin into the third bore to lock the tubular clutch element to the shaft means.

6. A clutch device for coupling a pair of rotatable shafts, comprising a tubular clutch element reciprocable axially on a rotatable shaft means, means preventing relative rotation of the said element and its shaft means, a pair of diametrically oppositie aligned bores extending through the wall of the tubular clutch element, a third bore in the shaft means aligned with one of the said element bores, pins in the element bores, a connector connecting the pins, a pair of posts on the connector, a spring engaging the posts at opposite ends to constrain the connector and pins in one diametral direction, a weight on the connector to move it by centrifugal force in the other direction, when rotated at speeds above a predetermined maximum to project a pin into the third bore to lock the tubular clutch element to the shaft means.

7. A clutch device for coupling a pair of rotatable shafts, comprising a tubular clutch element reciprocable axially on a rotatable shaft means, means preventing relative rotation of the said element and its shaft means, a pair of diametrically opposite aligned bores extending through the wall of the tubular clutch element, a third bore in the shaft means aligned with one of the said element bores, pins in the element bores, a connector connecting the pins, a spring constraining the connector and pins in one diametral direction, a weight on the connector to move it by centrifugal force, in the other direction when rotated at speeds above a predetermined maximum to project a pin into the third bore to lock the tubular clutch element to the shaft means, and a second weight on the clutch element to dynamically balance the device at predetermined rotational speeds.

8. In a clutch device for coupling a pair of rotatable shafts, an externally hexagonal clutch element rigidly connected to one shaft, an externally hexagonal sleeve rigidly connected to the other shaft, an internally hexagonal tubular clutch element axially movable on the sleeve, a groove in the movable clutch element for shifting it axially, a pair of aligned radially extending bores in the sleeve and movable clutch element, a bore in the movable clutch element diametrically aligned with the said bore therein, pins in the said movable element bores, a connector connecting the pins, a weight on the connector operable by centrifugal force at rotary speeds above a predetermined maximum to project a pin into the bore in the sleeve to lock the movable clutch element to the sleeve, and resilient means to normally hold the said pin withdrawn from the bore in the sleeve.

9. In combination with a rotary shaft, a clutch element rotatably locked with the shaft splined for axial movement therealong, means to axially move the clutch element, a radially movable key element comprising a ring encircling the clutch element having radially extending portions slidably engageable therewith and movable to lock the clutch element with the shaft against axial movement, spring means for maintaining the said portions out of locking position, and the ring being bodily movable radially due to centrifugal force above a predetermined speed to lock the clutch element with the shaft.

10. In a clutch mechanism for coupling a pair of shaft means, a clutch element on one shaft means, a reciprocable clutch element on the other shaft means, a pin adapted to be projected through the reciprocable clutch element into its shaft means to lock it against axial movement thereon, and a centrifugal device for projecting the pin at shaft means rotational speeds above a predetermined maximum comprising an element constrained to move radially of the clutch element and secured to the pin.

11. In a clutch mechanism for coupling a pair of shaft means, a reciprocable clutch element on one shaft means, a pin radially reciprocably supported on a reciprocable clutch element and adapted to be projected through the reciprocable clutch element into its shaft means to lock it against axial movement thereon, a centrifugal device for projecting the pin at shaft means rotational speeds above a predetermined maximum, said device comprising an eccentrically weighted element encircling the clutch element and restricted to radial movement relative thereto, and resilient means to normally maintain the pin in non-projected position at speeds below the predetermined maximum.

12. In a clutch mechanism for coupling a pair of shaft means, a clutch element on one shaft means, a reciprocable clutch element on the other shaft means, locking means adapted to be projected through the reciprocable clutch element into its shaft means to lock it against axial movement thereon, and a centrifugal device for projecting the locking means at shaft means rotational speeds above a predetermined maximum, said device comprising an element carried by the clutch element to rotate therewith in encircling relation and restricted to radial movement relative to the clutch element.

13. In a clutch mechanism for coupling a pair of shaft means, a clutch element rigidly connected to one shaft means, a reciprocable clutch element on the other shaft means adapted to telescope over the other clutch element, a pin adapted to be projected through the reciprocable clutch element into its shaft means to lock it against axial movement thereon, and a centrifugal device for projecting the pin, at shaft means rotational speeds above the predetermined maximum.

14. In a clutch mechanism for coupling a pair of shaft means, a clutch element rigidly connected to one shaft means, a reciprocable clutch element on the other shaft means, a pin radially reciprocably supported on the reciprocable clutch element adapted to be projected through the reciprocable clutch element into a shaft means to lock it against axial movement thereon, a centrifugal device for projecting the pin at shaft means rotational speeds above a predetermined maximum comprising a ring movable eccentrically of the shaft means axis, and resilient means to normally maintain the pin in non-projected position at speeds below the predetermined maximum.

15. In a clutch device for coupling a pair of rotatable shafts, a clutch element rigidly connected with one shaft, a reciprocable clutch element splined for axial movement on the other shaft, a transverse pin radially reciprocably supported on the reciprocable clutch element adapted to lock the splined clutch element with its shaft and normally maintained out of locking position by a spring, and a centrifugal device for moving the pin into locking position comprising a ring movable eccentrically of the shaft.

16. In combination with a rotary shaft, a clutch element rotatably fixed to the shaft and splined for axial movement thereon, means to operatively axially move the clutch element, a radially movable key element movable bodily by centrifugal force to change the center of mass relative to the shaft axis to lock the clutch element against axial movement on its shaft, a spring maintaining it out of locked position, and a centrifugal device for moving it into locked position, comprising an eccentrically weighted ring fixed to the key element.

17. In combination with a rotary shaft, a clutch element rotatably locked with the shaft and axially movable therealong, means to axially move the clutch element manually, a key element rotatable with the clutch element and bodily movable radially relative thereto to lock the clutch element with the shaft against axial movement along the shaft, a single spring means for maintaining the key element out of locked position, and the key element being movable by centrifugal force at a predetermined speed to overcome the spring means to radially move the key element to locking position by an eccentrically weighted element encircling the clutch element and fixed to the key element.

OSCAR U. ZERK.
DANIEL ROLAND VANNEMAN.